D. F. HERVEY.
PUNCTURE PROOF TIRE.
APPLICATION FILED FEB. 28, 1918.
1,289,463.
Patented Dec. 31, 1918.
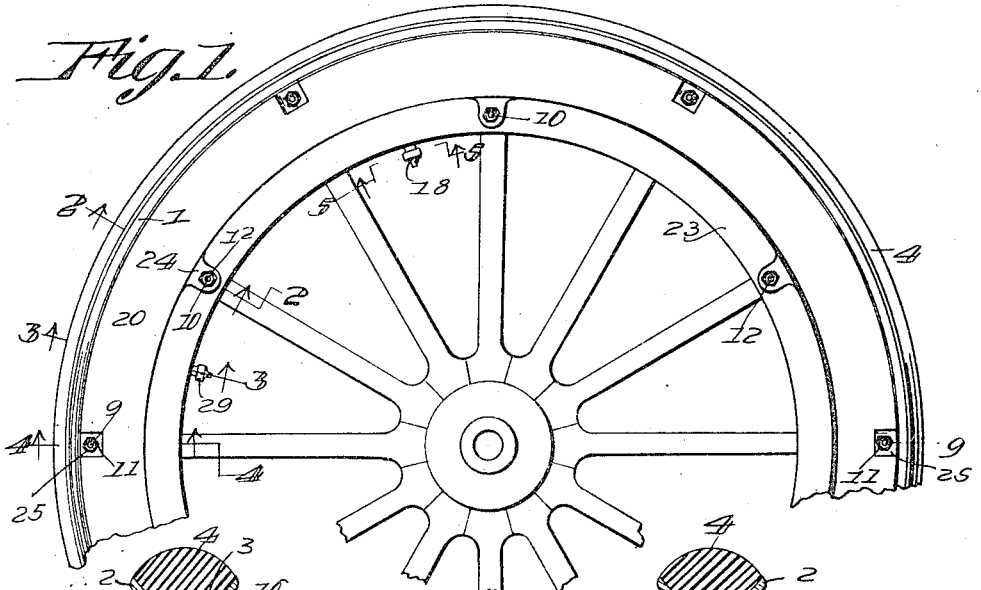
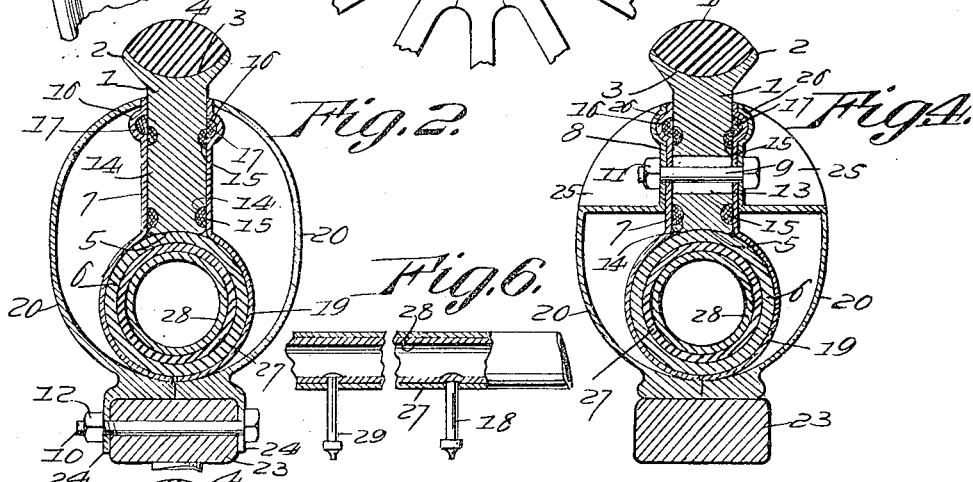
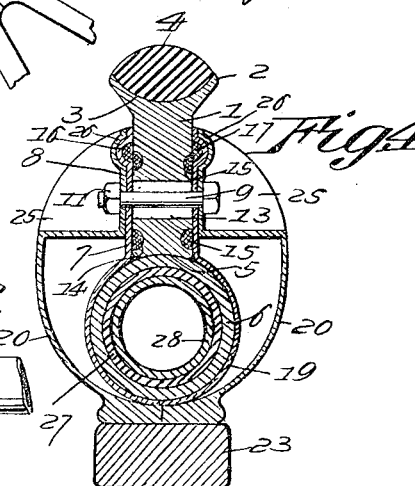
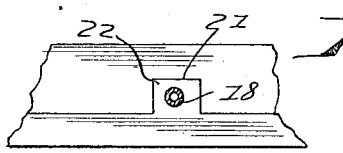
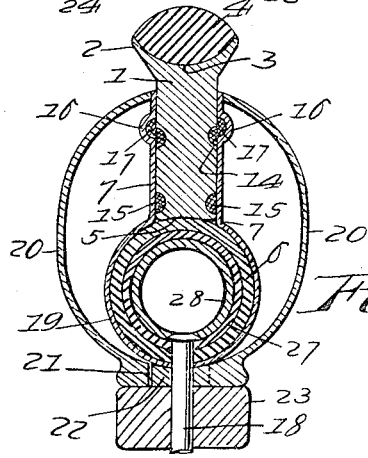
Inventor
David F. Hervey,
By E. H. Bond
Attorney

UNITED STATES PATENT OFFICE.

DAVID F. HERVEY, OF LOGANSPORT, INDIANA.

PUNCTURE-PROOF TIRE.

1,289,463.  Specification of Letters Patent.  Patented Dec. 31, 1918.

Application filed February 28, 1918. Serial No. 219,686.

*To all whom it may concern:*

Be it known that I, DAVID F. HERVEY, a citizen of the United States, residing at Logansport, in the county of Cass and State of Indiana, have invented certain new and useful Improvements in Puncture-Proof Tires of which the following is a specification.

This invention relates to certain new and useful improvements in vehicle tires and it has for its objects among others to provide a simple, cheap, yet durable and reliable pneumatic puncture-proof tire which will give the same or better degree of comfort than do the tires now in common use; also one that will be economical, effecting a big saving of gas or other power by reducing to a minimum the unnecessary contact or friction on the road, thus giving increased speed.

I aim to provide a tire composed practically all of metal, or of wood or other material stayed with metal, with the exception, of course, of the air tube or tubes employed and the solid rubber tread.

It has for a further object to provide a puncture-proof tire of the pneumatic type embodying a multiplicity of inner tubes each with an independent valve, so that should the one tube leak it will only be necessary to inflate the other and thus avoid the necessity of repair while on the road.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of a portion of an automobile wheel equipped with my tire, portions being broken away.

Fig. 2 is an enlarged section on the line 2—2 of Fig. 1, looking in the direction of the arrows.

Fig. 3 is an enlarged section on the line 3—3 of Fig. 1, looking in the direction of the arrows.

Fig. 4 is an enlarged section on the line 4—4 of Fig. 1, looking in the direction of the arrows.

Fig. 5 is a view of the innermost line of the tire next to the wheel, showing the same notched to lock the parts when held in place by tire clamps or other means, the valve being shown in section, as on the line 5—5 of Fig. 1, and the felly removed.

Fig. 6 is an elevation of the inner and outer tubes with portions broken away and parts in section, showing the inflating valves.

Like numerals of reference indicate like parts throughout the several views.

Referring to the drawing, 1 designates the tread ring, the outer surface of which is preferably enlarged laterally, as shown at 2, to form a groove or recess 3 for the reception of a tire 4 preferably of rubber or other suitable material frictionally held therein, as will be clearly understood upon reference to Figs. 2, 3 and 4, it being understood that this constitutes the tread. The inner periphery 5 of this ring bears against the pneumatic tube casing 6 and is supported in central or vertical alinement by and between the inner and outer casing plates 7 and 8, as will be clearly understood upon reference to Figs. 2, 3 and 4. These plates are held together and in place by the bolts 9 and 10 and lock nuts 11 and 12. The ring 1 is provided with the transverse elongated slots 13 through which pass the bolts 9 to allow for the necessary movement upon compression of the air tube casing 6.

Upon opposite faces of the ring 1 I provide depressions or the like 14 for the reception of gaskets 15 which may be of any suitable nature to provide for suitable lubrication as well as the exclusion of dust and dirt. Also, if desired, the inner plate 7 may be provided with like depressions or cavities 16 for the reception of similar gaskets or packing 17, as seen in Figs. 2, 3 and 4. The inner ring may be lubricated by flake graphite or other suitable dry lubricant which may be placed within the casing formed by the inner plate 7 and around the tube casing 6. The lock bolt 9 serves to provide the necessary adjustment to compensate for wear.

The inner casing plates 7 are at their inner ends made substantially semi-circular in cross-sectional form, as seen at 19, so as to properly house the tube casing 6, as seen in Figs. 2, 3 and 4, while the outer plates 8 are formed to give strength and the required appearance, as shown at 20, and when light metal, such as aluminum, is employed, the parts 7 and 20 may be cast in one piece recessed on the inside line, as seen at 21 in Fig. 5, it being understood that my present preferred form of construction is that the inner or tread ring 1 be held firmly by the parts 7, 8—20 and secured by the bolts 9 and 10, and by the tongue 22 engaging the recess 21, as seen in Figs. 3 and 5; thus forming an interengaging connection; also that the same or similar method of securing the parts may be employed if the casings are cast or built up of separate plates.

23 is the rim or felly through which the bolts 10 pass, as seen in Figs. 1 and 2, the outer plate 8 having the lugs or flanges 24, as seen clearly in Figs. 1 and 2, to embrace the felly and through which the said bolts 10 pass for securely affixing the said plates in position.

The outer plates 8 are offset, as at 25, see Fig. 4, and at their outer ends are provided with the curved enlargements 26 to receive the enlargements in which the cavities 16 for the gaskets 17 are formed, as clearly seen in Fig. 4.

The tread ring 1 may be of hard-wood covered with a light covering of brass or other suitable material to give the requisite strength and wearing surfaces. In the present instance I have shown the lines and dimensions suitable for the forward tires of a vehicle which may be equipped with wider or heavier parts to meet the requirements for use on the driving or rear wheels.

Within the tube casing 6 I place a plurality of separate and distinct ordinary inner tubes 27 and 28 (a greater number may be employed if found desirable). It will be readily seen that with the substantial housing or outer casing 16 these inner tubes will be protected against puncture, the object of the plurality of inner tubes being to provide and protect against a leak through the inflating valve. The one tube 27 has the inflating valve 18, while the other tube 28 has an independent inflating tube or valve 29, as seen best in Fig. 6. By this means, should either tube leak or either valve leak, I can inflate the other tube, as will be readily understood. When the inner tube 28 is inflated it, of course, forces the other tube outward against the casing 6.

From the foregoing description, when taken in connection with the annexed drawings, the operation of my improved puncture-proof tire will be readily understood and further detailed description thereof does not seem necessary.

While I have herein illustrated and described what to me at the present time seems to be the preferable way of carrying out the invention, it is evident that the same is subject to changes, variations and modifications in details of construction, proportion of parts, etc.; I, therefore, do not wish to restrict myself to the particular construction shown and described, but reserve the right to make such changes, variations and modifications as come properly within the scope of the protection prayed.

What is claimed as new is:—

1. A puncture-proof pneumatic tire comprising a tread ring, inner and outer casing plates, means holding said plates together, said tread ring having transverse elongated slots through which said means pass to allow of radial movement of the tread ring, and a tube casing within said plates and against which the inner face of the tread ring bears, the outer plates being of substantially semi-circular cross sectional form at the inner end, and flanged to embrace the felly and formed with an interlocking connection substantially in alinement with the said tread ring.

2. A puncture-proof pneumatic tire comprising a tread ring, inner plates within which it is movable, outer plates having portions embracing said inner plates, said inner plates having their inner ends substantially semi-circular in cross sectional form to serve as a tube casing, a pneumatic tube in said casing, said outer plates being offset and the tread ring formed with elongated slots, bolts passed through the inner and outer plates at said offsets and loosely through the slots of the tread ring to allow of movement of the latter, the outer plates having means for attachment to the felly and provided with interlocking connection to prevent creeping on the felly.

In testimony whereof I affix my signature in the presence of two witnesses.

DAVID F. HERVEY.

Witnesses:
CHRISTINE KOZA,
HARRY C. MILLER.

Copies of this patent may be obtained for five cents each, by addressing the "Commissioner of Patents, Washington, D. C."